(12) United States Patent
Welton et al.

(10) Patent No.: US 9,663,957 B2
(45) Date of Patent: May 30, 2017

(54) FLOOR COVERING AND FILMS FOR USE THEREWITH

(75) Inventors: Nicholas Welton, Sollhull (GB); Adrian John Shortland, Northfield (GB); Clive Ralph Ashton, Leamington Spa (GB)

(73) Assignee: Valspar Sourcing, Inc., Minneapolis, MN (US)

( * ) Notice: Subject to any disclaimer, the term of this patent is extended or adjusted under 35 U.S.C. 154(b) by 869 days.

(21) Appl. No.: 12/309,053

(22) PCT Filed: Jun. 29, 2007

(86) PCT No.: PCT/EP2007/056612
§ 371 (c)(1),
(2), (4) Date: Nov. 10, 2009

(87) PCT Pub. No.: WO2008/003662
PCT Pub. Date: Jan. 10, 2008

(65) Prior Publication Data
US 2010/0092745 A1    Apr. 15, 2010

(30) Foreign Application Priority Data

Jul. 6, 2006   (GB) .................................. 0613425.8
Jul. 7, 2006   (GB) .................................. 0613495.1

(51) Int. Cl.
*E04F 15/10*   (2006.01)
*B32B 27/18*   (2006.01)
(Continued)

(52) U.S. Cl.
CPC .............. *E04F 15/10* (2013.01); *B32B 27/18* (2013.01); *B32B 27/30* (2013.01); *C08J 7/047* (2013.01);
(Continued)

(58) Field of Classification Search
CPC ......... B32B 27/30; B32B 27/18; C08L 27/16; C08L 27/12; C08L 33/06; C08L 33/08;
(Continued)

(56) References Cited

U.S. PATENT DOCUMENTS 3,365,315 A * 1/1968 Beck ..................... C03B 19/107
264/31
3,711,576 A * 1/1973 Hwa .............................. 525/239
(Continued)

FOREIGN PATENT DOCUMENTS

| EP | 0 347 745 A2 * | 12/1989 | ............. B32B 27/20 |
| EP | 1136615 | 9/2001 | |
| WO | 2006/037977 | 4/2006 | |

OTHER PUBLICATIONS

Howick, Christopher, Published on the Web Dec. 14, 2006, Green Chemistry, New developments in emulsion-PVC polymerisation to produce polymers with the potential of reduced or zero VOC requirements when used in plastisol applications.*

*Primary Examiner* — Nathan Van Sell

(57) ABSTRACT

A film for application to the upper surface of a floor covering comprising: (a) a blend of an acrylic resin and a fluoropolymer resin; and, optionally (b) anti-slip particles wherein the film comprises two or more layers. A method of forming the floor covering is also disclosed.

7 Claims, 3 Drawing Sheets

(51) Int. Cl.

| | |
|---|---|
| *B32B 27/30* | (2006.01) |
| *C08J 7/04* | (2006.01) |
| *C08L 27/12* | (2006.01) |
| *C08L 27/16* | (2006.01) |
| *C08L 33/06* | (2006.01) |
| *C08L 33/08* | (2006.01) |
| *C08L 33/12* | (2006.01) |
| *B29L 31/00* | (2006.01) |

(52) U.S. Cl.
CPC ............... *C08L 27/12* (2013.01); *C08L 27/16* (2013.01); *C08L 33/06* (2013.01); *C08L 33/08* (2013.01); *B29L 2031/732* (2013.01); *C08J 2327/12* (2013.01); *C08J 2433/00* (2013.01); *C08L 33/12* (2013.01); *Y10T 156/1041* (2015.01); *Y10T 428/24983* (2015.01); *Y10T 428/3154* (2015.04); *Y10T 428/31544* (2015.04)

(58) Field of Classification Search
CPC ....... C08L 33/12; C08L 2666/04; C08J 7/047; C08J 2327/12; C08J 2433/00; E04F 15/10; B29L 2031/732; Y10T 156/1041; Y10T 428/24983
USPC .................................. 428/217, 220, 421, 422
See application file for complete search history.

(56) References Cited

U.S. PATENT DOCUMENTS

| | | | |
|---|---|---|---|
| 4,745,139 A | * | 5/1988 | Haasl .................. C09D 153/00 106/36 |
| 4,773,959 A | | 9/1988 | Smith et al. |
| 4,791,015 A | | 12/1988 | Becker et al. |
| 5,229,460 A | * | 7/1993 | Yousuf et al. ................ 525/198 |
| 5,316,608 A | | 5/1994 | Ocampo et al. |
| 5,536,530 A | * | 7/1996 | Landers et al. ............... 427/197 |
| 5,569,524 A | * | 10/1996 | Akatsu et al. ................ 428/215 |
| 6,444,311 B1 | | 9/2002 | Friedman et al. |
| 2004/0211130 A1 | | 10/2004 | Horstman et al. |

\* cited by examiner

FLOOR COVERING AND FILMS FOR USE THEREWITH

PRIORITY

The present patent Application claims benefit from International Application Number PCT/EP2007/056612, having a PCT Publication Number of WO 2008/003662 A1, which was filed on 29 Jun. 2007, which in turn claims priority from Great Britain application number 0613425.8, filed on 6 Jul. 2006, and Great Britain application number 0613495.1, filed on 7 Jul. 2006, both entitled "Floor Covering & Films For Use Therewith," the entireties of said applications are incorporated herein by reference.

The present invention relates to a film for a floor covering. In addition, it relates to a floor covering including the film. More particularly, it relates to a vinyl floor covering including the film. The floor covering is preferably a floor tile.

Figure 1:
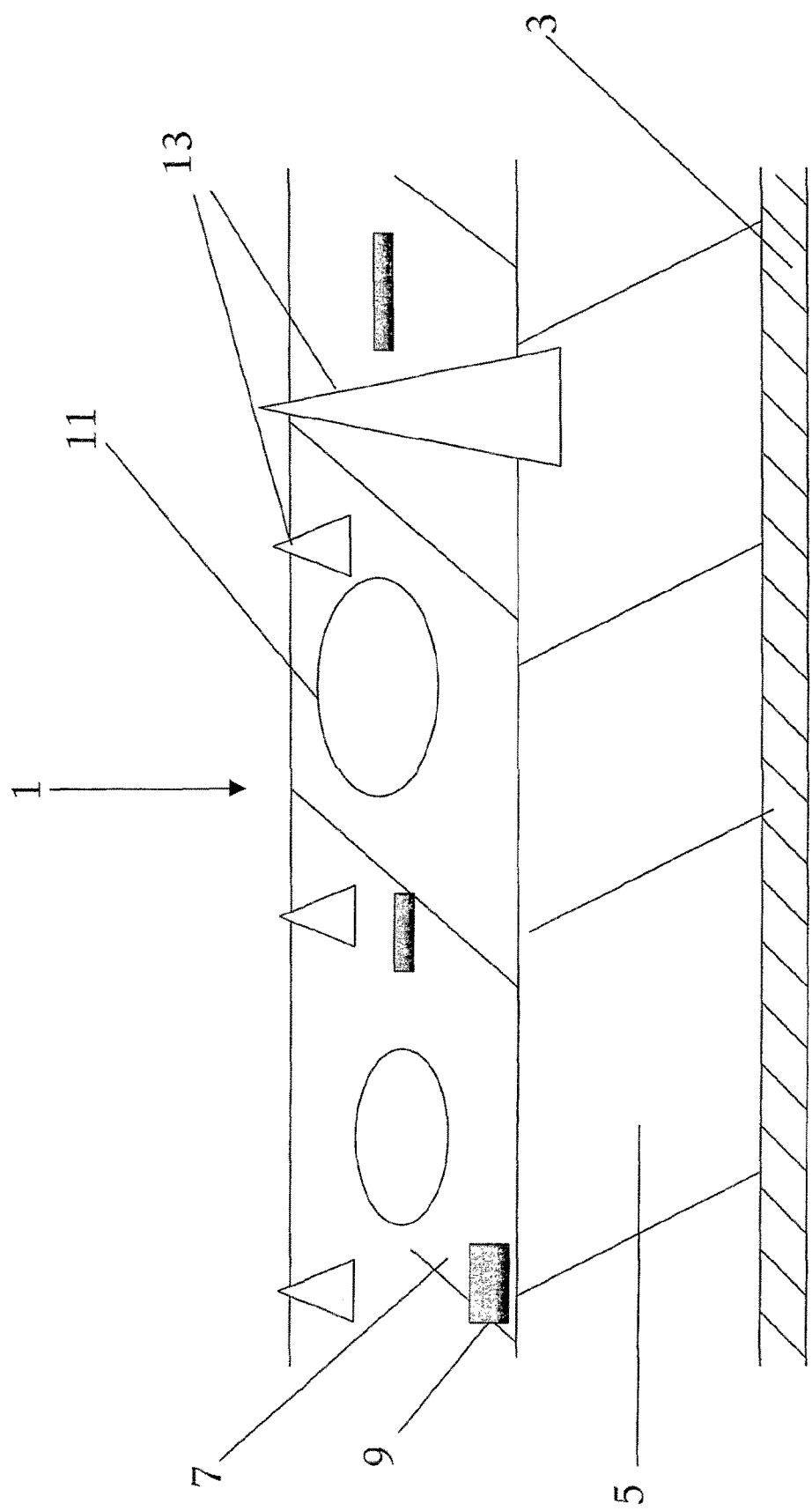
FIG. 1 depicts a flooring material 1 including substrate 3 with a undercoat 5 applied thereon. A layer 7 is applied over the undercoat 5. Embedded within layer 7 are glass beads 11 and colored PVC chips 9. Embedded in layer 7 and penetrating to undercoat 5 are polymeric grits 13.
Figure 2:
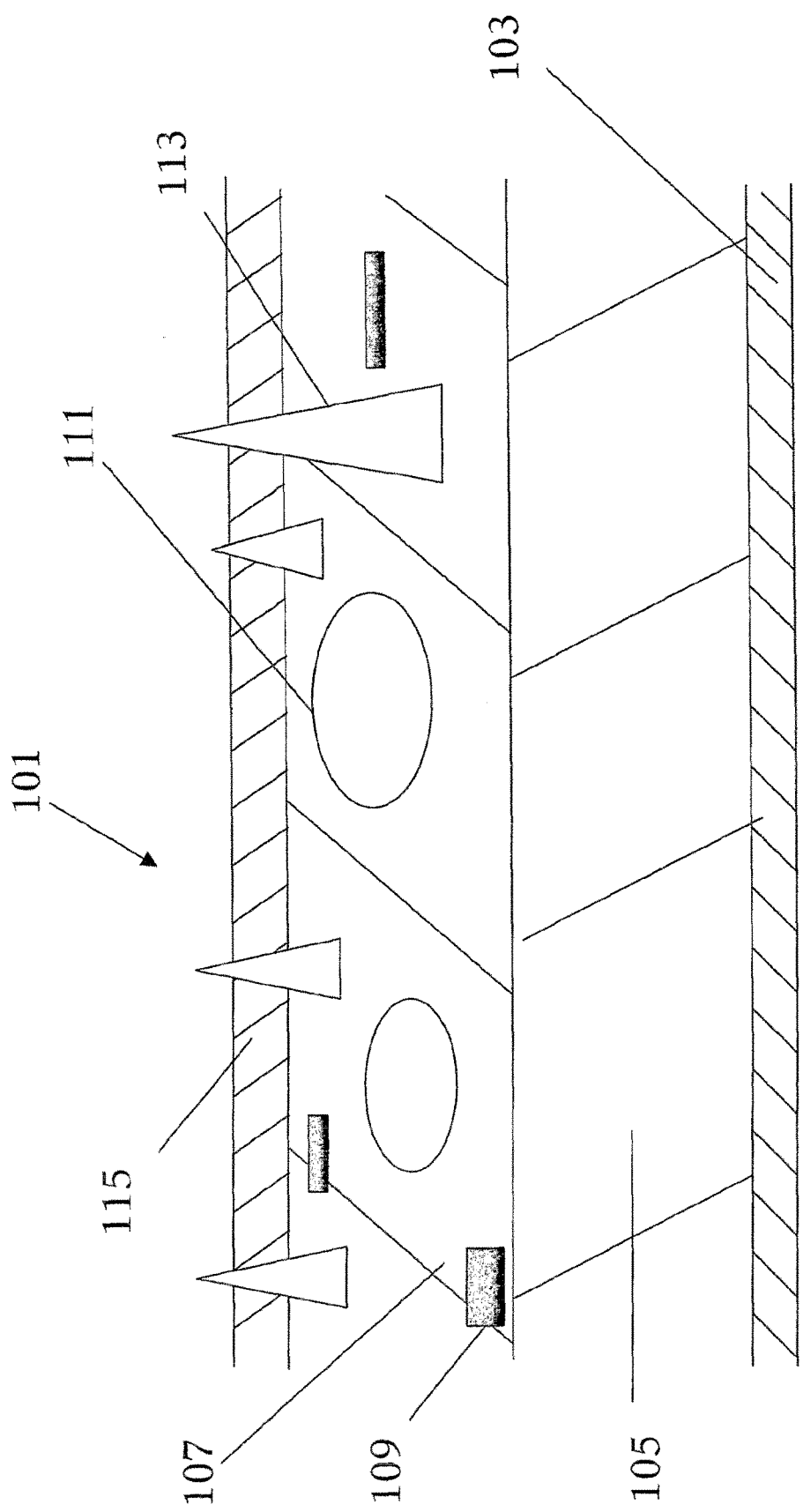
FIG. 2 depicts a flooring material 101 that includes a substrate 103, an undercoat 105 and a layer 107. Embedded within layer 107 are glass beads 111 and colored PVC chips 109. A barrier layer 115 is applied on top of layer 107. Embedded in barrier layer 115 and penetrating into layer 107 are polymeric grits 113.
Figure 3:
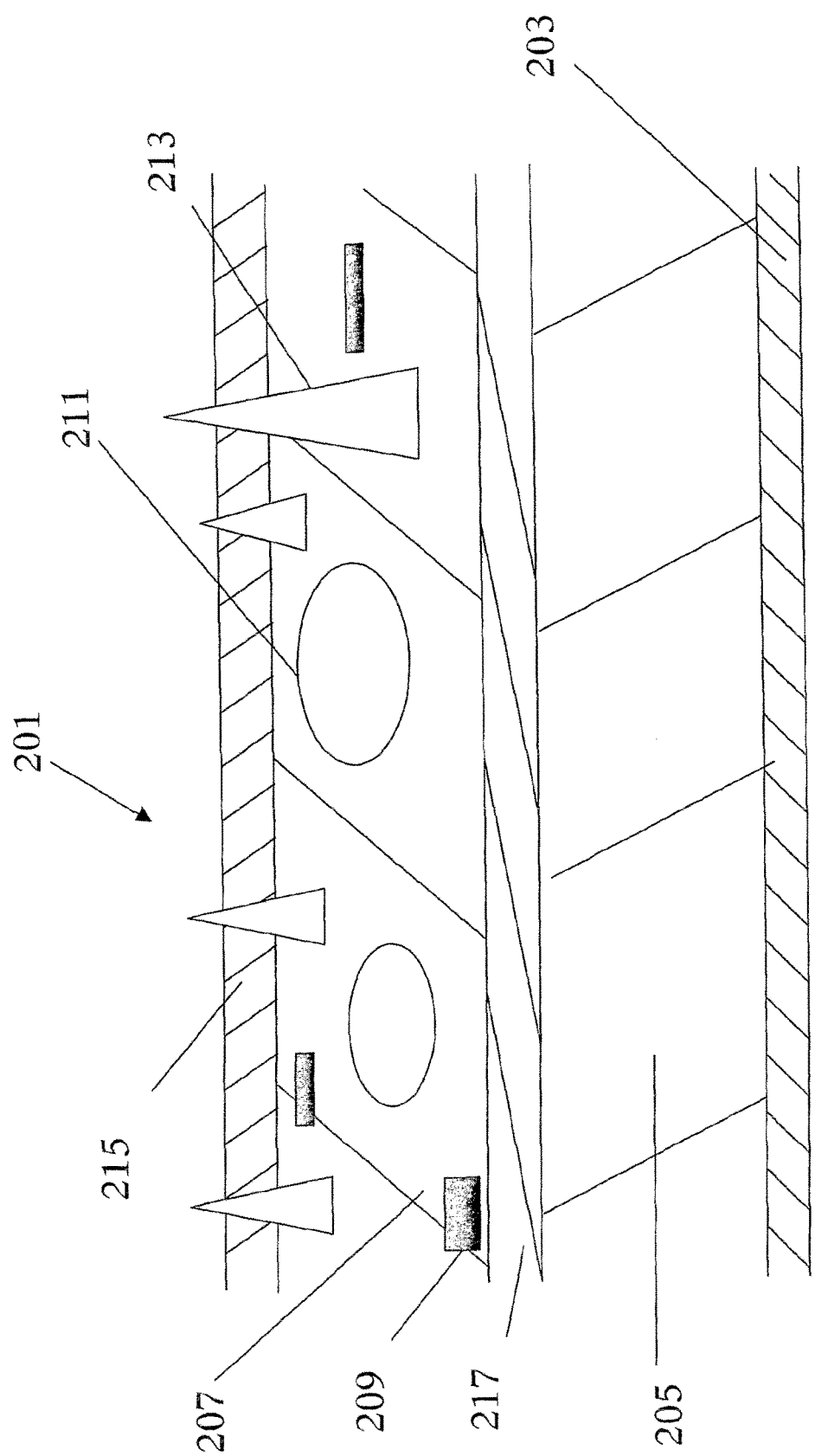
FIG. 3 depicts a flooring material 201 that includes a substrate 203 and an undercoat 205. A design layer 217 is applied over undercoat 205. On top of the design layer is applied a layer 207. Embedded within layer 207 are glass beads 211 and colored PVC chips 209. A barrier layer 215 is applied over layer 207 and embedded in the barrier layer 215 and penetrating layer 207 are polymeric grits 213.

It will be understood that the term "tile" is not limited to any particular shape or dimension and may, for example, refer to a shape which might otherwise be referred to as a plank. The term "tile" as used herein should be construed accordingly.

Conventional vinyl tiles, i.e. those made from plasticized polyvinylchloride have a laminate structure generally comprising from about 2 to about 9 sheets of material each layer being formulated for a particular function. Such tiles generally comprise a base layer which contributes to the rigidity of the tile and generally has an underside that is textured to provide a key for the adhesive which will be used to bond the tile to the floor.

Other layers which might be present include a flame retardant layer, a coloured backing layer to provide a backing for the print design, a print layer that combines with the coloured backing layer to provide a decorative design and one or more clear wear layers which serve to protect the integrity of the design and provide desired properties such as anti-static, wear resistance and improved visual clarity to the print layer. The films making up these conventional layers are generally made by calendaring techniques.

Floor coverings made of these conventional tiles are finding increased acceptance in both the residential and commercial sectors.

Floor coverings for residential use are generally supplied with a surface UV cured acrylate/urethane anti-stain layer which helps the tile resist the staining which can occur in the domestic environment. The coating is generally applied to the pre-formed tile and thus is a secondary off-line process. It can be applied as a 100% solids liquid coating that is subsequently cured with UV light, a water based UV cured urethane, a water based force air dried urethane or a solvent based coating. The process can be modified to include the application of the coating layer such that it is in-line with the tile manufacture process.

Whilst the process provides a satisfactory product for residential use, there are issues associated with its manufacture due to the health and safety considerations of storing and using liquid chemicals using UV curing equipment which must be properly shielded. Further problems arise relating to the complexity of the process step and quality control issues.

The above described anti-stain layer can be applied to floor coverings which are intended for commercial applications. Commercial applications include, but are not limited to, healthcare venues such as doctor and dentist surgeries, hospitals, pharmacists and the like, offices, food outlets such as fast-food shops, restaurants and the like, transport applications such as station concourses, waiting rooms, airports and even flooring within transport vehicles, and retail such as shops, supermarkets, superstores, warehouses and the like.

It is desirable to provide stain resistant floor covering products which have the desired properties and which can be provided at an appropriate cost for commercial applications where the level of wear can be substantially higher than in the residential environment and the sources of staining may be more severe.

WO 2006/037977 describes a slip-resistant plastics flooring material having an upper surface which is formed by a first layer of a plastics material which first layer of plastics material has on its upper surface a particulate layer of one or more polymeric particles which polymeric particles provide a slip-resistant effect and are bonded to the first layer of plastics material which is claimed to have enhanced cleanability and retention of the slip-resistant polymeric particles. However, the flooring material described therein, whilst providing anti-slip properties, is found to have a soft surface and therefore an unacceptable rate of wear can be noted. This is problematic since slip resistance can be quickly reduced on exposure to foot-traffic. A method of forming the flooring material is described in which the anti-slip particles are applied to a coating after it has been applied to the flooring.

One particular problem arises where the floor covering is for use in automotive car showrooms and other areas where flooring may come into contact with tyres or other items produced from similar materials to tyres.

When a vehicle is placed on a conventional vinyl floor covering or one coated with a factory applied urethane coating described above. A particular problem arises because chemical additives present in the rubber of the tyres, in particular certain classes of anti-oxidants, migrate from the tyre into the surface of the vinyl tile resulting in an unsightly brown stain in the area of contact. As the stain is drawn into the body of the tile, it cannot generally be removed. It may be possible to remove it with strong and harmful chemicals but these not only remove the stain but also tend to damage the surface of the flooring such that its aesthetic appeal is substantially reduced.

There is therefore a need for a floor covering, particularly a vinyl floor covering that can be used in areas where the risk of staining is high and in particular in areas where products containing additives which can migrate into the flooring material will be placed on the floor and left in prolonged contact. In particular, there is a need for a vinyl floor covering which can be used in the car showroom and similar markets. It is also desirable that the floor covering is resistant to other materials with which it may come into contact. For example, in the car showroom market, the floor covering should be able to withstand contact with oil, petrol, anti-freeze, car cleaning products etc. It is also desirable that the surface of the flooring has resistance to wear.

It will be appreciated that the flooring will be equally useful in other applications where tyres can be in prolonged contact with the floor covering such as motorbike and bicycle showrooms, transport museums, pram and pushchair shops, agricultural and construction equipment showrooms, conference centres, office and other areas where the floor may have rubber soled cabinets placed on it, furniture shops, shoe shops, hotels, airports, areas where rubber wheeled trolleys are used and the like.

Although materials other than laminated vinyl flooring can be used in these markets, these suffer from various drawbacks and disadvantages. Whilst ceramic tiles, including stone and concrete, can be used such flooring has limited design possibilities in terms of designs and patterns which may be applied. However, more serious is the problem associated with its poor mechanical properties, high installation costs and the fact that if a portion of the floor covering, such as a tile, becomes damaged or an area of a larger area becomes damaged, they cannot easily be replaced.

Ease of replacement may be an important factor in any retail market not only from the need to be able to replace damaged areas but also because periodic changes in image, identity, colours and the like may be required.

An epoxy/urethane screed may also be used. Here the design possibilities, the high installation costs and problems in replacement are even more pronounced than with the ceramic flooring.

Wood and laminated wood products can be used but they do not generally have the desired resistance to denting. That is to say the wood can readily be compressed under, for example, the weight of a car or even the heel of a customer and the denting is irreversible.

Other products, such as carpet, rubber and the like can be used. Whilst these might have the desired resistance to damage, they do not meet the requirements of stylish modern appearance nor do they generally meet the other requirements of low maintenance, i.e. be easy to clean and stay clean, anti-slip surfaces and in other ways to be fit for purpose.

It is therefore an object of the present invention to provide a flooring material which meets most, and preferably all, of the requirements detailed above.

According to a first aspect of the present invention there is provided a film for application to the upper surface of a floor covering comprising:

(a) a blend of an acrylic resin and a fluoropolymer resin; and, optionally (b) anti-slip particles wherein the film comprises two or more layers.

In a second aspect of the present invention there is provided a film for application to the upper surface of a floor covering comprising:

(a) a blend of an acrylic resin and a fluoropolymer resin; and (b) anti-slip particles.

The two or more layers which make up the film are preferably discrete layers.

The film of the present invention when applied to a floor covering such as a vinyl floor covering offers various advantages. Most importantly when the film is applied to a floor covering, anti-oxidants and other materials in rubber components such as tyre are prevented from leaching into the floor covering such that the previously occurring unsightly stains are avoided.

The film also offers other advantages in that not only does it prevent the staining detailed above but also is resistant to staining from foot traffic, household chemicals and other general chemicals, is scratch resistant, offers enhanced UV and anti-microbial protection to the floor covering. It may also provide benefits in connection with graffiti-resistant or at least graffiti-removable surfaces.

Any suitable acrylic resin may be used. Without wishing to be bound by any theory, it is believed that the acrylic component imparts hardness, has high clarity, low costs and has good adhesion to a polyvinylchloride floor covering. Examples of suitable acrylic resins include but are not limited to those made from alkyl methacrylate such as methyl methacrylate, alkyl acrylate, ethyl methacrylate, ethyl acrylate, butyl acrylate, and other olefinically unsaturated monomers. In addition combinations of different acrylic polymers may be used. Impact modified polymers may also be used.

Any suitable fluoropolymer resin may be used. Without wishing to be bound by any theory, it is believed that the fluoropolymer component provides good mechanical properties, has stay clean properties and ease of cleaning properties due to its low surface energy and high chemical resistance. The fluoropolymer also increases wear resistance. Examples of suitable fluoropolymer resins include but are not limited to those of homo-, co- and ter-polymers of vinylidene fluoride, tetrafluoroethylene, hexafluoropropylene, vinyl fluoride and ECTFE.

Any suitable ratio of acrylic resin to fluoropolymer resin in each layer may be used. In one arrangement the ratio may be from about 70:30 to about 30:70 although ratios of from about 60:40 to about 40:60 or those of about 50:50 may be used. The ratios of acrylic resin to the fluoropolymer resin in each layer may be the same or different. In one arrangement the layers may have different compositions such that they have different properties. The anti-slip particles may be present in each layer or may only be present in the upper-most layer.

In one arrangement of the present invention, one layer may be a material which whilst having the desired anti-staining and the like properties may be difficult to handle in processing such as it may be brittle in handling prior to lamination. Examples of materials which would be brittle are those having a high ratio of acrylic resin to fluoropolymer resin. Although specific ratios will vary with the particular materials selected, other components present and the like, a brittle layer may be obtained with an amount of about 40 to about 55% fluoropolymer, with about 48% to about 50% fluoropolymer.

The second layer may be a variant of the film which is stronger and is more readily handled. Examples of materials which would be stronger and more readily handled are those having a high ratio of fluoropolymer resin to acrylic resin. Although specific ratios will vary with the particular materials selected, other components present and the like, a stronger layer may be obtained with an amount of about 55 to about 70% fluoropolymer, with about 58% to about 60% fluoropolymer.

The layers making up the film of the present invention may be formed by co-extrusion. Usually when a brittle and a tougher material are co-extruded it would be expected that the product film would have the mechanical properties of the brittle layer. However, surprisingly with the film of the present invention, it has been found that the film has the characteristics of the stronger material thereby facilitating handling. Further, the co-extruded film will generally have the improved surface properties of the more brittle layer. Thus in the film of this embodiment of the present invention will be applied such that the side of the film comprised by the stronger film is adjacent the floor covering and the side of the film with the enhanced surface properties is uppermost.

The blend of acrylic resin and fluoropolymer used in the lower layer of the discrete layer may be selected to have a higher melt elasticity at processing temperatures such than as the layers are pressed together during processing, the lower layer will resist the anti-slip particles from being pushed from the upper layer into the lower layer. The melt elasticity is important in maintaining slip resistance particularly during embossing. The optimum melt elasticity for each layer will be a function of various operating parameters including shear rate and temperature. However, it can readily be assessed using routine experimentation.

The film of the present invention may additionally include other components. For example polyesters, polyurethane, flexible acrylic, acrylate modified polyolefins and the like may be used provided that there is compatability and adhesion to the other materials present. The presence of these cheaper materials may be particularly advantageous in the lower layer of the film of the present invention.

Any suitable anti-slip particles may be used. Inorganic particles such as silicon carbide, quartz, aluminium oxide, crushed glass, glass spheres, glass bubbles, silica, ceramic particles, or ground minerals may be used. Inorganic particles are advantageous as they are sufficiently hard and thereby control the rate of wear of the finished floor and retain the slip resistant properties.

Organic particles such as polyolefin, ionomer, rubber particles, acrylate polymers, polyester, nylon, polycarbonate, polyoxymethylene, fluoropolymer, styrenated polymer, polyurethane, core-shell particles, or high temperature polymers such as PEEK, PES and PEK may be used. The organic particles may be formed from materials which may be in any suitable form including thermoplastic, bead, powder, fluff or cross-linked form. In general, where polymeric particles are used they may be selected to have high melting points such that they will not melt and flow during processing of the film.

A mixture of organic particles or inorganic particles may be used where appropriate.

Where anti-slip particles are used they may be present in both or all layers or may only be present in the upper layer. In one arrangement where the particles are present in both or all layers, the amount of particles present in the upper layer may be higher than in the, or each, lower layer The particles may be surface treated to bond to the film. The benefit of this is that there are no gaps between the film and particles which where present can allow for dirt ingress.

The film of the present invention may be of any appropriate thickness. In general it may be from about 1 µm to about 500 µm. More preferably it may be from about 30 µm to about 250 µm or from about 50 µm to about 100 µm. A film thickness of from about 60 µm to about 80 µm such as 70 µm may be particularly preferred.

The amount of particles used will be selected to provide the desired properties. The size of particles will again be selected to provide the desired properties. The size will generally be selected such that in use the particles stand proud of the surface of the film. In one arrangement the size of the particles may be selected to be about half that of the thickness of the film.

As the film of the present invention will desirably be clear such that underlying colour and/or print layers can be seen, the nature and size of the particle will generally be selected such that the clarity of the film is not unacceptably affected.

Additives may be included in the film of the present invention. For example, tracer elements such as fluorescent tracers or laser activated tracers may be included as these offer advantages of enabling interaction with security aspects. Other conventional additives known to the art may also be incorporated to impart additional functionality to the product. These include, but are not limited to, pigments (translucent, opaque, thermochromic, photochromic and metallic or pearlescent), anti static agents, anti microbial additives, waxes (to improve mark resistance, scratch resistance, anti soiling and gloss control), texturing agents, process aids and/or lubricants, gloss control agents, heat stabilisers, anti soiling additives, light stabilisers, reinforcing fillers, viscosity modifiers, impact modifiers, conductive additives.

A further advantage of the present invention is that the film is free of volatile organic compounds such as solvent. This has benefits from a health and safety perspective.

The film of the present invention not only provides the stain resistance discussed above but also imparts slip resistant properties to the floor. In addition, it has low dirt pick up properties and is easy to clean.

The film of the present invention may be made by any suitable method. One advantage of the present invention is that the film does not require any special equipment for its manufacture.

According to a second aspect of the present invention there is provided a floor covering comprising on its upper surface the film of the above first aspect. The floor covering may be any suitable floor covering but is preferably a vinyl floor covering such as a tile.

The floor covering of the invention may comprise a substrate layer and, laminated thereto, the film of the invention. The substrate layer itself may be a multi-layer material, for example a multi-layer laminate. The film layer may be laminated with the substrate layer, in an in-line lamination process. However in some cases it may be possible to coextrude the film of the invention onto the substrate layer.

The film of the present invention may be applied to the floor covering by any suitable means. However, it is important that the process utilised maintains the slip resistant properties of the film. Traditional approaches to achieve the micro-roughness required for slip resistance would be to contact the flooring with a micro-roughened, e.g. sand blasted, emboss roller. However, the product made by such a technique suffers from increased dirt pickup in service and poor cleanability since the dirt sits in the valleys created by the embossing process. A further problem is that with use the mechanically created emboss is worn away. Safety floors may include inorganic particles to achieve slip resistance.

The particles in the film of the present invention provide the required anti-slip property and thus the requirement for micro-roughened embossing rollers is obviated and the film of the present invention can be applied using conventional embossing rollers which may carry embossing for aesthetic reasons.

According to a third aspect of the present invention there is provided a process for manufacturing a floor covering comprising:

(a) producing a floor covering at a temperature of from about 100° C. to about 230° C.;

(b) applying thereto in an integral process while the floor covering is at a temperature of from about 100° C. to about 200° C. a film comprising a blend of an acrylic resin and a fluoropolymer resin and optionally anti-slip particles; and (c) embossing the product of step (b).

In one arrangement the floor covering may be formed at a temperature of from about 150° C. to about 200° C. The application of the film may be carried out at a temperature of from about 130° C. to about 190° C.

The embossing step (c) will preferably be carried out at the same temperature as that used in step (b). Any suitable pressure may be used for the embossing step, however pressures of from about 30 psi to about 110 psi are particularly suitable. Any suitable residence time may be used. Residence times of from about 10 s to about 120 s are particularly suitable.

The process may additionally include the steps of:

(d) cooling the product to a temperature of from about 20° C. to about 70° C.;

(e) reheating to a maximum temperature of about 100° C.; and (f) cooling the product.

Examples of the acrylic resin, fluoropolymer resin and the optional anti-slip particles are provided above. In one example of the third aspect of the present invention, the film applied in step (b) is the film of the above first aspect of the present invention.

According to a fourth aspect of the present invention there is provided a floor covering produced according to the process of the above third aspect.

According to a fifth aspect of the present invention there is provided the use of the floor covering of the second or fourth aspect in contact with rubber products for prolonged periods. The rubber products are preferably tyres.

The film of the invention may also be applied to surface coverings other than floor coverings—for example, wall or work surface coverings. It has been discovered that graffiti applied to such surfaces may be easily removed in some cases.

The present invention will now be described by way of example.

In an example of the present invention two compounds, A & B detailed in table 1, were manufactured by, i) Premixing the dry ingredients in a high speed Henschel mixer ii) Melt compounding the blend in a co-rotating twin screw extruder at 200° C.

iii) Water quenching the strand before pelletising into small (nominally 2 mm by 3 mm) pellets

| | % | |
|---|---|---|
| Ingredient | A | B |
| Poly(methyl methacrylate) | 47.5 | 28.5 |
| Poly(vinylidene fluoride) copolymer | 47.5 | 66.5 |
| Benzotriazole UV Absorber | 0.5 | 0.5 |
| Glass bubbles (30 to 50 um) | 4.0 | 4.0 |
| Process lubricant (montan wax) | 0.5 | 0.5 |

The pellets of compound A were loaded into one single screw extruder and the pellets of compound B loaded into a second single screw extruder. Both extruders fed a co-extrusion manifold die. The film exited the die at around 500 microns and was drawn down to the required thickness, by altering the speed of the haul off, onto a heated roller. The film was coextruded to form a composite clear film roll having a nominal overall thickness of 70 µm with each individual layer having a nominal thickness of 35 µm. The particles included stood proud of the film. It was trimmed to a nominal width of 1 m and wound into rolls.

A standard PVC tile was produced by laminating together 1 or more packing PVC layers which may or may not be pigmented, a pigmented PVC face layer, a PVC print layer to impart the design and 1 or more clear PVC wear layers. The plies are laminated together around a series of heated drums under tension. Typical lamination temperature would be in the region of from 150° C. to 200° C.

The film material was then laminated to the tile while it was still hot. The resulting product was then embossed to the desired design.

Careful control of emboss temperature and pressure ensures that the particles present in the film will not be pushed and that the product adopts the required texture from the emboss roll.

The product is then cooled through a series of cooling drums ranging in temperature from about 20° C. to about 70° C. before being trimmed to the required size which may be 1 m×1 m. The slabs are then annealed by reheating to a maximum temperature of 100° C. and forced air cooling to room temperature before being cut into individual tiles.

The tiles of the present invention can be laid using conventional floor laying techniques. A new car tyre placed in contact with the tile of the present invention for a period of 1 year did not cause any staining in the tile. The problems with staining are generally worse with new car tyres than worn ones.

The invention claimed is:

1. A clear, stain-resistant film for application to the upper surface of a floor covering comprising:
    (a) a co-extruded blend of an acrylic resin and a fluoropolymer resin; and
    (b) 4% by weight of inorganic anti-slip particles comprising glass bubbles,
    wherein the film comprises at least a first upper layer and a second lower layer,
    wherein the first layer is a brittle layer and the second layer is a stronger layer,
    wherein the film is free of volatile organic compounds,
    wherein the first layer includes about 40 to 55% fluoropolymer and the second layer includes about 55 to 70% fluoropolymer, and
    wherein the film has thickness of from about 30 µm to 250 µm.

2. A film according to claim 1 wherein a lower layer of the film does not include anti-slip particles.

3. A film according to claim 1 wherein the acrylic resin is an alkyl methacrylate or an alkyl acrylate.

4. A film according to claim 1 wherein the fluoropolymer is selected from the group consisting of homo-, co- and ter-polymers of vinylidene fluoride, tetrafluoroethylene, hexafluoropropylene, vinyl fluoride and ECTFE.

5. A film according to claim 1, wherein the first layer of the film has a different composition than the second layer of the film.

6. A film according to claim 1, having a thickness of from about 50 µm to about 100 µm.

7. A film according to claim 1, having a thickness of from about 60 µm to about 80 µm.

* * * * *

UNITED STATES PATENT AND TRADEMARK OFFICE
CERTIFICATE OF CORRECTION

PATENT NO. : 9,663,957 B2
APPLICATION NO. : 12/309053
DATED : May 30, 2017
INVENTOR(S) : Nicholas Welton, Adrian John Shortland and Clive Ralph Ashton It is certified that error appears in the above-identified patent and that said Letters Patent is hereby corrected as shown below:

(A) NAME OF ASSIGNEE          (B) RESIDENCE should read:
Amtico International Limited   United Kingdom
Valspar Powder Coatings Limited United Kingdom Signed and Sealed this
Eighth Day of May, 2018

Andrei Iancu
*Director of the United States Patent and Trademark Office*